United States Patent [19]
McGraw

[11] Patent Number: 6,036,811
[45] Date of Patent: Mar. 14, 2000

[54] LEAKPROOF SEAMS FOR NON-CONTAINABLE WATERPROOF/BREATHABLE FABRIC COMPOSITES

[75] Inventor: John J. McGraw, Indianapolis, Ind.

[73] Assignee: Liteliner International Holdings, Co., LLC, Dover, Del.

[21] Appl. No.: 09/093,107

[22] Filed: Jun. 8, 1998

Related U.S. Application Data

[63] Continuation-in-part of application No. 08/697,648, Aug. 27, 1996, Pat. No. 5,766,400.

[51] Int. Cl.$^7$ .................................................. B32B 31/00
[52] U.S. Cl. .......................... 156/251; 156/267; 156/269; 156/290; 156/308.4
[58] Field of Search ..................... 156/251, 267, 156/269, 290, 308.4, 510, 515, 549

[56] References Cited

U.S. PATENT DOCUMENTS

| | | | |
|---|---|---|---|
| 3,656,594 | 4/1972 | Marks et al. | 16/126 |
| 4,135,957 | 1/1979 | Voller | 156/157 |
| 4,469,744 | 9/1984 | Grot et al. | 428/246 |
| 4,545,841 | 10/1985 | Jackrel | 156/290 |
| 4,574,173 | 3/1986 | Bennett | 219/10.53 |
| 4,643,791 | 2/1987 | Jurrius et al. | 156/251 |
| 4,804,432 | 2/1989 | Jurrius et al. | 156/350 |
| 4,831,667 | 5/1989 | Town | 2/163 |
| 4,847,918 | 7/1989 | Sturm | 2/161.6 |
| 4,943,475 | 7/1990 | Baker et al. | 428/246 |
| 5,024,594 | 6/1991 | Athayde et al. | 428/246 |
| 5,036,551 | 8/1991 | Dailey et al. | 2/167 |
| 5,123,119 | 6/1992 | Dube | 2/168 |
| 5,133,344 | 7/1992 | Jurrius et al. | 128/201.23 |
| 5,234,523 | 8/1993 | Battrreal | 156/283 |
| 5,235,713 | 8/1993 | Guthrie et al. | 5/453 |
| 5,244,525 | 9/1993 | Neuwirth et al. | 156/251 |
| 5,294,258 | 3/1994 | Jarrell et al. | 118/410 |
| 5,336,346 | 8/1994 | Meltzer et al. | 156/73.4 |
| 5,348,604 | 9/1994 | Neff | 156/272.8 |
| 5,349,166 | 9/1994 | Taylor | 219/643 |
| 5,366,801 | 11/1994 | Bryant et al. | 442/131 |
| 5,402,540 | 4/1995 | Williams | 2/239 |
| 5,484,645 | 1/1996 | Lickfield et al. | 428/198 |
| 5,494,736 | 2/1996 | Willey et al. | 428/288 |
| 5,543,604 | 8/1996 | Taylor | 219/643 |
| 5,569,507 | 10/1996 | Goodwin et al. | 428/76 |
| 5,700,544 | 12/1997 | Goodwin et al. | 428/76 |

FOREIGN PATENT DOCUMENTS 0562703  12/1994  Japan.

Primary Examiner—James Sells
Attorney, Agent, or Firm—Klehr, Harrison, Harvey, Branzburg & Ellers, LLP

[57] ABSTRACT

A prefabricated multi-layered flexible product which can be used as a liner for an outer shell or as a stand-alone product. A substrate fabric material is placed in parallel with a synthetic film membrane to form a two ply laminate with excess membrane at an edge thereof. A pair of the laminates are overlaid with the substrate fabrics opposing each other with the fabric edges aligned, and a thermoplastic film is strategically placed in between the layers to enhance bonding between the fabric layers and the excess membranes. The laminate(s) and/or separate sheets of above materials are assembled by using a radio frequency welding process and then out into two or three dimensional forms, which in their bonded state form either a prefabricated component liner or a prefabricated stand-alone product. The form may be a glove, sock, shirt, boot/shoe, hat, jacket, pant, etc.

15 Claims, 2 Drawing Sheets ured mold and foam forms, the layers for the inner liner are cut and are thermowelded or bonded together to form a three dimensional inner shell of a glove. Then the formed inner shell is attached to an outer glove shell by conventional methods.

LEAKPROOF SEAMS FOR NON-CONTAINABLE WATERPROOF/BREATHABLE FABRIC COMPOSITES

CROSS REFERENCE TO RELATED APPLICATION

This application is a continuation-in-part of U.S. Ser. No. 08/697,648 filed Aug. 27, 1996, now U.S. Pat. No. 5,766,400.

FIELD OF THE INVENTION

This invention relates to the fabrication of waterproof, waterproof/breathable, windproof (with or without vapor permeable/moisture vapor transfer) apparel involving a post- or a pre-lamination process in order to provide a water tight seam. More specifically, this invention teaches the formation of leakproof welded fabric seams for non-containable fabrics such as those used in a firefighter's gloves.

BACKGROUND OF THE INVENTION

To date liners for apparel and footwear have been assembled by the stitch and seam method whereby two layers are joined by a stitch pattern creating a seam. Waterproofing the seam was accomplished by taping and gluing the seam. However taped and glued, stitched seams tend to fail when subjected to stress from repeated use.

U.S. Pat. No. 4,847,918 issued to Sturm discloses a flexible fire retardant and heat insulating glove that is mounted within and cemented to a flexible, water tight, vapor permeable plastic glove. A flexible reinforcement element having the outline of the plastic glove, with fingers somewhat longer than the fingers of the plastic glove, is cemented to one face of the plastic glove in substantial registry therewith. The fingers of the reinforcement element were extended beyond the fingers of the plastic glove to provide securement tabs. These securement tabs are stitched or tacked to the tips of the fingers of a reversed leather glove and reinforcement element.

U.S. Pat. No. 5,036,551 issued to Daily et al. concerns elastomeric composite fabrics which have a layered construction and are made of a microporous polymeric membrane, water vapor permeable polymer, and an elastomeric thermoplastic non-woven material. The elastomeric composite fabrics provide barrier properties with water vapor permeability and find utility in articles which conform about another object.

U.S. Pat. No. 5,123,119 issued to Dube concerns a two component, waterproof, breathable glove and the corresponding methods of forming the glove. A homogenous membrane in regard to its permeability characteristics is attached to a fabric. The membrane is tacky on one surface and wear resistant on the other surface. Using a contoured mold and foam forms, the layers for the inner liner are cut and are thermowelded or bonded together to form a three dimensional inner shell of a glove. Then the formed inner shell is attached to an outer glove shell by conventional methods.

U.S. Pat. No. 5,234,523 issued to Battreall discloses a method for laminating a gas permeable layer onto a preformed substrate by forming a laminate precursor comprising a substrate and a gas permeable layer in which a layer of adhesive is positioned between the gas permeable layer and a substrate surface. A layer of water is formed on the surface of the gas permeable layer and the wetted surface is contacted by a preheated platen and superheated steam is ejected onto the gas permeable layer causing the adhesive to cure and bond the gas permeable layer to the substrate.

U.S. Pat. No. 5,294,258 issued to Jarrel et al. concerns a breathable laminate which comprises at least two porous webs laminated together with a porous adhesive matrix, preferably a random fibrous adhesive pattern having a coat weight of between 1.5 and 12 grams per square meter. The two or more porous webs comprise woven or non-woven materials and the resulting breathable fabric or laminate has good hand flexibility. Breathable fabric is adhered to the foam by such random adhesive patterns of similar coat weights. Coating widths of up to 80 inches or more are produced in a slot die, with motors and pumps controlled to maintain consistent, uniform coat weights regardless of coat widths and substrate speeds selected.

U.S. Pat. No. 5,366,801 to Bryant et al. describes a coating which when applied to fabrics enhances the thermal characteristics of the coated fabric. The coating includes integral and leak-resistant microcapsules filled with phase change material or plastic crystals that have specific thermal properties at predetermined temperatures.

A disclosure of Toshiichi Osako describes an arctic glove comprised of a cloth material on the outside, waterproof materials in the middle layer and a woven or knit material on the inside. The three layers are bonded together with adhesives in a dotted state.

U.S. Pat. No. 5,569,507 to Goodwin et al. discloses a laminated seam with outer tabs formed by heat sealing a membrane-backed composite layer to itself with a continuous layer applied as a hot melt to a fabric front layer. The heat and pressure of the heat sealing is said to penetrate the fibers in the fabric of the composite with the adhesive to form a leakproof seal impenetrable by viruses.

As far as applicant is aware, there is no teaching or suggestion of obviousness in the prior art respecting the present invention method of producing a synthetic film membrane and substrate fabric laminate or an outer substrate fabric, substrate fabric and synthetic film membrane laminate for application as a liner for clothing and footwear as described herein. More particularly, there is no teaching or suggestion of utilizing the laminates disclosed herein in a manner which forms a seal in non-containable fabrics such as NOMEX® or KEVLAR® which are used in a firefighter's gloves to make them heat resistant.

SUMMARY OF THE INVENTION

The present invention addresses the seam assembly of a non-containable fabric laminated to a synthetic membrane, such as, for example, a firefighter's glove comprising a NOMEX® or KEVLAR® aramid fiber shell laminated inside a breathable/waterproof synthetic membrane or bladder. Such firefighter's gloves are typically made with an outer leather covering over the membrane and a cotton or other fabric liner inside the aramid fiber shell. Before the present invention, it was difficult to form a leakproof, watertight seam at the outer edges of the aramid fiber/membrane. The membrane had to be assembled separately and then cemented in place over the aramid fiber glove if taping and cementing were to be avoided.

By "non-containable" it is meant that the fabric cannot be thoroughly penetrated by suitable adhesives using practicable temperatures and pressures and bonding conditions to form a leakproof seal completely through the fiber layer to the membrane, either because the fabric is too thick and/or because the interstices of the fabric do not connect through the fabric layer to allow molten adhesive to flow through. An example of a non-containable fabric is aramid fabric obtained under the trade designations NOMEX®, KEVLAR® or the like. Thus, the invention is described with reference to non-containable fabrics that cannot be adequately seamed to form a leakproof seal using the methodology described in U.S. Pat. No. 5,569,507. However, there is no reason that the present invention cannot also be used to seal containable fabrics as well.

According to the present invention, the membrane is laminated to the fiber layers and the fiber/membrane laminates are welded together using a thermoplastic joiner film and RF welding techniques. The fiber layers are precut to have a common edge when overlaid, so as to place the common edges in register with each other. The membranes are positioned over the topmost and under the bottommost fiber layers so as to be opposite outer faces of the fiber layers. The membranes are larger than the fiber layers and extend outwardly of the common edges. The joiner film is positioned between the fabric layers so as to be opposite the inner faces of the fabric layers, and the assembly is welded together so as to fuse the fiber layers with the joiner layer inside the common edges, and so as to fuse the membranes together with the joiner layer outside the common edges. The membranes and the joiner film are continuous across the width of the seam so as to form a leakproof seal across the fabric edges. The fiber layers and the membrane can be pre-laminated prior to the welding step, but they are preferably welded to each other during the same welding step during which the joiner film is melted.

In one aspect, then, the present invention provides a fabric seam for forming a leakproof seal between non-containable fabric composites. The fabric seam includes first and second parallel fabric sections finished to have at least one matching edge, an inner seam portion extending inwardly from the matching edges, and an outer seam portion extending outwardly from the matching edges. The inner seam portion includes opposing inner faces of fabric sections secured to a parallel thermoplastic joiner film and parallel outer faces secured to first and second synthetic membranes. The outer seam portion includes the first and second synthetic membranes secured together on opposite sides of the joiner film. The synthetic membranes and joiner film are continuous between the inner and outer seam portions to form a seal therebetween.

The fabric sections are preferably made of aramid fibers. The thermoplastic joiner film is a polyolefin, polyurethane or the like. The outer seam can be finished or cut to terminate at a distance spaced from the matching edges. Positioning tabs can be formed to extend outwardly from the matching edges. The joiner film preferably terminates adjacent to an inner edge of the inner seam. If desired, positioning tabs can be formed in the joiner film to extend inwardly from the inner edge of the inner seam.

In another aspect, the present invention provides a method for forming a leakproof seal between non-containable fabric composites. The method includes the steps of: (a) finishing first and second fabric sections to have at least one matching fabric edge; (b) overlaying a first synthetic membrane parallel with the first fabric section wherein the first synthetic membrane extends beyond either side of the matching edge; (c) overlaying the first fabric section parallel with a thermoplastic joiner film extending beyond either side of the matching edge; (d) overlaying the joiner film parallel with the second fabric section with the matching edge thereof in register with the matching edge of the first fabric section; (e) overlaying the second fabric section parallel with a second synthetic membrane extending beyond either side of the matching edge; and (f) welding adjacent the matching fabric edges to form a seam securing the fabric sections to the joiner film on one side of the matching edges and securing the synthetic membrane to the joiner film on the other side of the matching edges. The method is particularly applicable to being used with non-containable fibers such as aramid, which cannot be adequately penetrated by a thermoplastic to form a leakproof seal with the application of practicable pressures and temperatures. The finishing step can include the step of finishing the fabric sections along the matching edge. For example, the method can include the step of precutting the joiner film along a contour spaced inwardly from the matching edges. If desired, the precutting step can form positioning tabs extending inwardly from the seam. The method can also include tearing excess joiner film away from an inner edge of the seam.

The method can also include the step of removing excess joiner film and synthetic membrane along an outer edge of the seam. For example, the excess joiner film and synthetic membrane can be removed by die cutting or manually cutting away the materials. If desired, the cutting can form positioning tabs extending outwardly from the seam. Preferably, the welding step (e) secures the first and second synthetic membranes to the respective first and second fabric sections along the matching edges thereof. For example, each membrane can be fused to the respective fabric section in the seam along an outer face of the fabric section extending inwardly from the matching edge, and fused to the matching edge along a transverse dimension thereof. If desired or necessary, the method can include the step of inserting tie layers between the first and second fabric sections and the respective first and second synthetic membranes prior to the welding step.

DETAILED DESCRIPTION OF THE INVENTION

The present invention is a method of producing prefabricated, multi-layered flexible products eliminating traditional post-construction techniques for clothing and apparel made of non-containable fibers, such as producing a liner using sewn seams which must be taped and glued for waterproof application. In this invention, the method can be used to weld together laminates which are produced through conventional means by adhering substrate non-containable fabric material to a synthetic film membrane and/or separate sheets of substrate non-containable fabric material and synthetic film membrane, to form the prefabricated, multi-layered flexible product. The laminates or separate sheets are placed in a parallel configuration with the center sheet being the thermoplastic joiner film, with or without adhesive properties. The joiner film and the synthetic film membranes extend outwardly beyond edges of the substrate non-containable fabric material. These are then assembled by using a radio frequency (RF) welding process at the perimeter of the outer edge of the desired pattern of the article, outlining a specific form such as a glove or mitten. Welding the layers together produces a seam comprising an inner seam portion and an outer seam portion. The inner seam portion extends inwardly from the fabric edges and comprises the fabric layers joined together at the joiner film on the inside and the outer membrane joined to outer faces of the fabric sections. The outer seam comprises the membranes fused together at the joiner film layer and the membranes are continuous from the inner seam across the otherwise exposed edges of the fabric to the joiner film.

Figure 1:
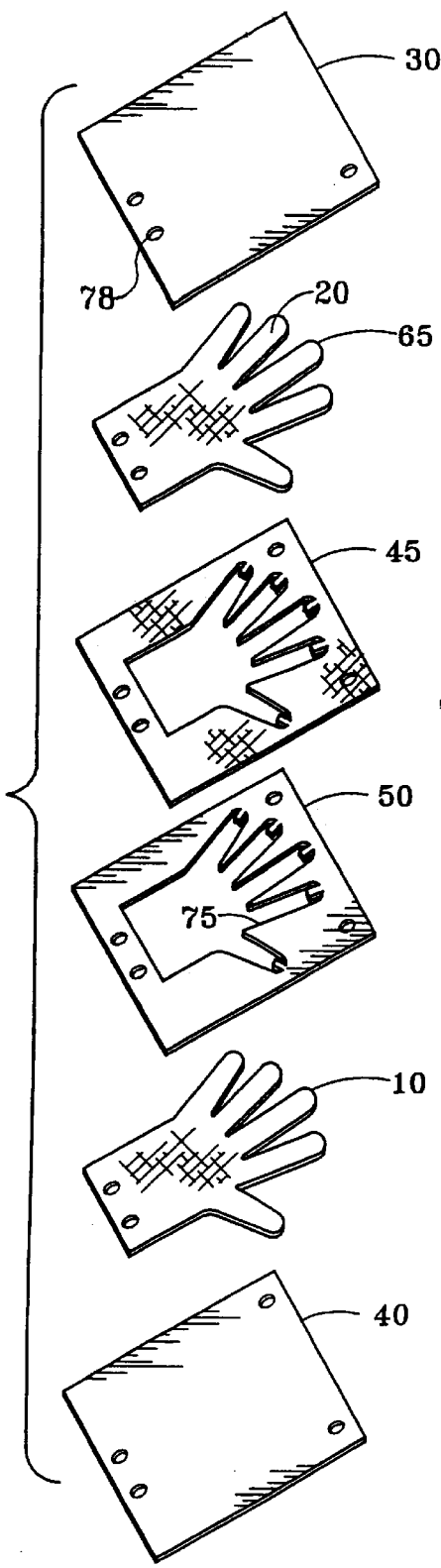
FIG. 1 is an exploded cross sectional view of a composite fabric seam assembly according to the present invention.

With reference to FIG. 1, the fabric pieces cut into gloves 10, 20 or other shapes are overlaid and underlaid with their respective membranes 30, 40. A thermoplastic joiner film 50 is sandwiched between the glove shapes 10, 20 and is positioned so as to straddle the edges 65 of the glove shapes 10, 20 (see FIG. 2). Outwardly of the edges 65, the ends 70 of the membranes 30, 40 are in contact with the joiner film 50. Preferably, the inner end 75 of the joiner film 50 is precut to match a contour of the desired shape of the edges 65. The joiner film 50 can be in the form of a tape or a design pattern similar to the configuration of the edges 65. For example, a glove which needs to be welded only at the perimeter to create a welded seam, only requires the joiner film 50 at that same perimeter. In order to prevent film waste or stripping after the product has been welded, the joiner film 50 is precut to the inner dimensions of the welding die, so that after welding, the joiner film 50 is not found inside the glove, and therefore no stripping is necessary. Then, after the glove is die cut outside the weld as discussed in more detail below, the glove is finished in the usual fashion.

An optional mesh fabric layer 45 (see FIG. 1) can be used to reinforce the inner and outer tabs formed in the joiner layer 50. If the optional layer 45 is used in this manner, additional welding time should be allowed to let the joiner film 50 flow through the layer 45 and bond to the adjacent glove shape 20.

If desired, a conventional tie layer (not shown) can be used between the membranes 30, 40 and the respective fabric layers of the glove shapes 10, 20. The tie layer is preferably water-based since solvent-based tie layers generally result in weaker bonds. The tie layer should also preferably be thermoplastic to flow and join with the joiner film as opposed to a thermoset which cannot adequately flow to seal well with the joiner film.

For straight seams, joiner film 50 is held in place relative to the ends 70 of the membrane using guide pins (not shown) which are received in holes 78 of each layer. After the weld is accomplished, the ends 70 being held by the pins are cut and removed and the product is finished per design. See FIGS. 3 and 4.

If the product can be turned inside out, the joiner film 50 can be stripped away to easily form an end 75 after the weld has been accomplished. The excess joiner film 50 which is stripped away can be recycled for re-use. For using the stripping away method, the product should be small, in case the excess joiner film cannot be configured for further use to keep waste of the joiner film 50 to a minimum.

Figure 5:
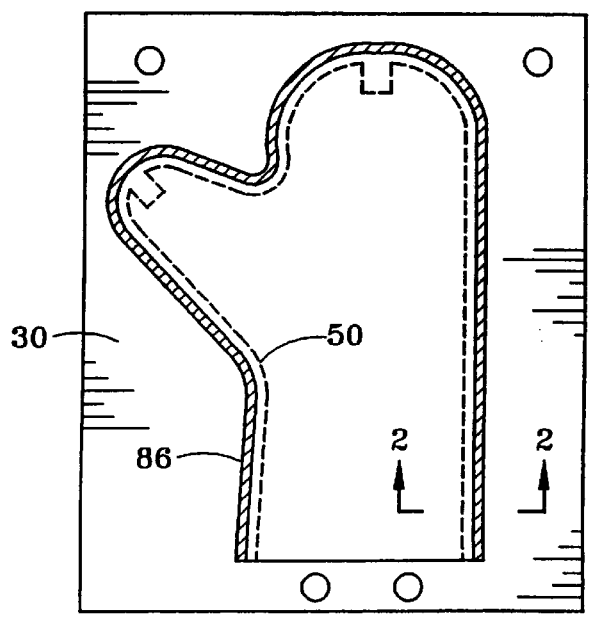
FIG. 5 is a plan view of the arrangement of FIG. 2 showing the weld rod in relation to the fabric edges for a mitten.
Figure 2:
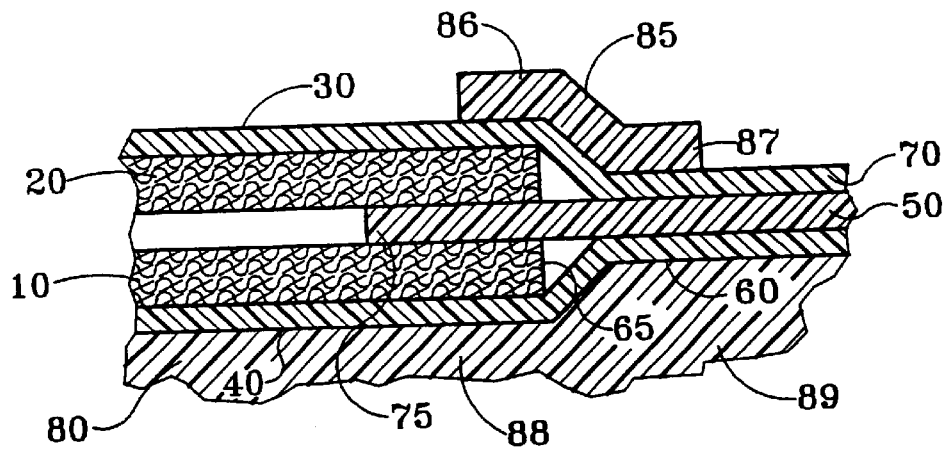
FIG. 2 is a cross sectional view of the assembly of materials of FIG. 1 in relation to a welding bar and platen prior to RF welding.

With reference to FIGS. 2 and 5, the assembled substrate layers are shown placed on a platen 80 underneath a welding rod 85. In an embodiment shown in FIG. 2, the platen 80 and the welding bar 85 are contoured or stepped with inner end 86 and region 88 raised and depressed with respect to outer end 87 and outer region 89, respectively. Alternatively, the platen 80 and the welding rod 86 can be flat, or one of the platen 80 and welding rod 85 can be contoured or stepped and the other flat. The press is conventionally leveled prior to use in RF sealing. The platen 80 can be heated, for example, to 150° F. to help avoid shifts in temperature of the die 85 in contact with the material being heat sealed. The material to be heat sealed is compressed between the die 85 and the platen 80, preferably at a pressure of from about 15 to about 20 psi. This allows the die or welding rod 85 to be closed firmly against the material to be heat welded, and as the joiner film 50, any tie layer (not shown) and membranes 60, 70 heat up from the applied RF power, the die 85 is allowed to sink in to create a molecular bond of the fabric layers 10, 20 and the membranes 60, 70 with the joiner film 50.

As is known in the art, heat is produced by the reaction of the plastic to the high frequency energy from the RF generator relayed through the die 86. The amount of heat depends on the quantity of RF power applied to the die 85 and the reactivity of the materials to be welded. The pressure applied to the die 85 can be supplied by a pneumatic or hydraulic press. The time of the RF welding is controlled by electronic timers built into the control circuits of the operating press (not shown). RF machines typically include a pre-seal timer, which allows the press to supply full and even pressure on the materials prior to the RF power being applied; a heat seal timer to control the length of time the RF power is applied to the materials; and a dwell or cool timer which is used to allow the material time to set while there is still pressure on the materials.

Figure 3:
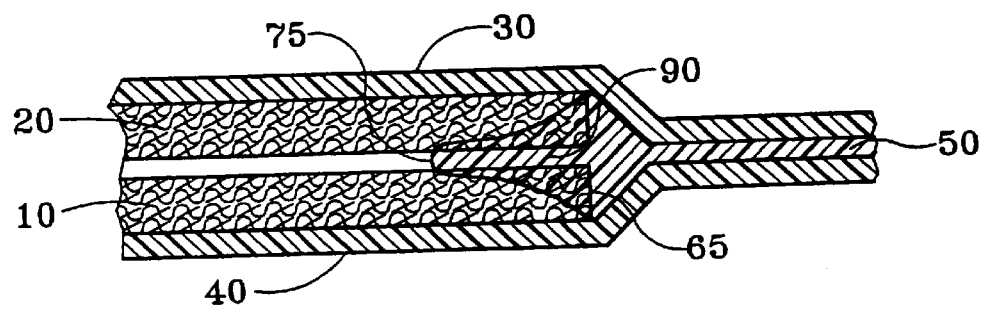
FIG. 3 is a cross sectional view of the seam formed by welding as shown in FIG. 2

With reference to FIG. 3, the product following RF sealing is illustrated. The thermoplastic joiner film 50 has melted and filled into voids in the non-containable fabric to form a seal between the fabric layers 10, 20, as well as between the membranes 30, 40. At the same time, the membranes 30, 40 are fused to the outer surfaces of the respective fabric layers 10, 20. The membranes 30, 40 are continuous between the welds to the fabric layer 10, 20, to the welds with the joiner film 50 covering the edges 65. Thus, the double welding of the membranes 30, 40 forms a leakproof seal. The membranes 30, 40 can also weld to the otherwise exposed edges 65 of the fabric section 10, 20 for additional seam strength. In contrast to other welding techniques, however, the joiner film 50 serves to anchor the fabric layers 10, 20 together. This anchoring of the fabric layers 10, 20 to the joiner film S0 serves to minimize stress at the double welds of the membranes 30, 40 so that the seam is stronger and less likely to fail from repeated stress of the seam. The anchoring serves to avoid overstressing the membranes 30, 40 when there is stress on the seam, thereby contributing to the durability of the seam.

Figure 6:
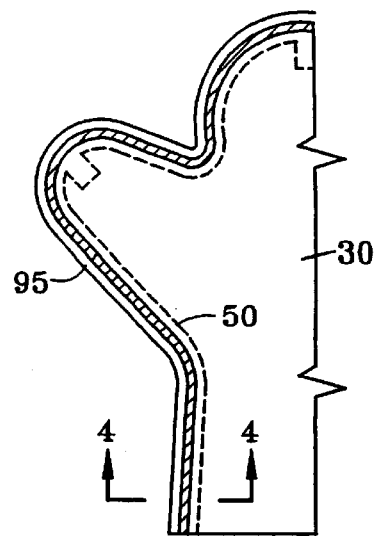
FIG. 6 is a plan view of a mitten assembled according to FIG. 4.
Figure 4:
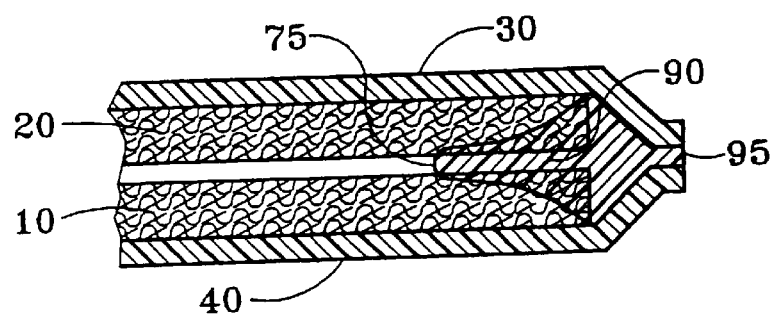
FIG. 4 is a cross sectional view of the seam of FIG. 3 following finishing the outer edge of the seam.

Following the RF welding, the article is finished, for example, by die cutting or manually cutting an outer edge of the seam to form a finished edge 95 as shown in FIGS. 4 and 6.

EXAMPLE 1

A thermoplastic sheet was used as a joiner film between non-containable fabric layers and outer waterproof/breathable layers according to the principles of the present invention. The joiner film was a 16 mil polyester aromatic polyurethane blown film having a Shore A hardness of 83, obtained from Stevens Urethane, a division of JPS Elastomerics Corp. under the trade designation ST 1528-83A. Each non-containable fabric layer was KEVLAR® fireproof fabric having a weight of 8 ounces/yard. The outer membrane was 1 mil (30 g/m$^2$) polyurethane obtained under the trade designation FILM 55FR from Proline Textile (Perone, France).

The joiner film was die cut to remove the center portion of the sheet in the pattern of a glove having perimeter dimensions just inside the expected sewn perimeter line of the actual glove, but leaving a tab of material projecting inwardly at the tip of each finger toward the hand and wrist region of the glove. The tabs were sized and positioned to provide means within the seam that could be used for attaching an inner liner, i.e. inner tabs.

Two glove shapes were cut from the KEVLAR® fabric with a perimeter about ⅛-inch larger than that of the cutout in the joiner film to provide an overlap.

Two pieces were cut from the FILM 55FR material in the shape of rectangles with dimensions just outside the greatest dimensions of the glove pattern. The die cut joiner film layer was positioned between the KEVLAR® glove layers, and the FILM 55FR was positioned on the top and under the bottom, above and below the respective upper and lower KEVLAR® glove layers, by means of guide pins between each of the layers.

A radio frequency (RF) welding tool was fastened to the upper platen of a Thermatron 10 kw RF welding machine equipped with a 25-in. by 40-in. bed plate and a 20-in. by 30-in. upper heated platen. The RF welding tool was in proper registration with a foot fixture having the guide pins that register the fabric layers and joiner film directly underneath inside the press of the welding machine. The registration was such that the welding line of the tool followed the perimeter of the glove pattern, falling just inside the perimeter of the KEVLAR® by ⅛-inch and just outside the KEVLAR® layer perimeter by ⅛-inch, and dead center on the die cut shape of the joiner film, so that the welding captured just the edge of the joiner film between the edges of the KEVLAR® layers and a ⅛-inch overlap of the outer membrane layers outside the KEVLAR® layers to join with the joiner film.

The RF welding machine was turned on, the pre-seal time set to 2 seconds, the seal time set to 9 seconds, and the cool timer set to 4 seconds. The low pressure air on the 4-in. diameter cylinder of the RF welding machine was set to 120 psig and the power setting to 27.0 relative (on the high side of the power curve). The platen heater was set to heat the upper platen to a temperature of 110° F. The ram adjustment was not set, allowing the upper platen to completely bottom out on the materials in the press.

The press cycle was initiated to close the press and allow the cycles through pre-seal, seal and cool. The press was opened to obtain the five layers welded in the shape of the glove pattern. The assembly was removed and moved to a clicker cutting device having a foot fixture that matched the foot fixture device used in the bottom or bed plate of the RF welding machine. The foot fixture of the clicker cutter had guide pins identical to those in the RF welding machine to maintain proper registration. A steel rule die having the shape of the glove was fastened to the upper platen of the clicker cutting tool. The line of the steel rule die followed the line of the RF welding tool except for tabs that extended outwardly from the hand region and the tips of the fingers, i.e. outer tabs. The clicker cutter was a standard 25 ton type designed to force the steel rule die through the material, cutting a line along the glove pattern, hitting the material in the middle of the weld (except at the outer tabs) between the joiner film and the outer membrane layers, just outside the perimeter of the KEVLAR® layers.

Once the material was registered with the clicker and the cutting tool, the press was closed and then opened to remove the two pieces. The waste was separated from the glove product. The glove product had inner tabs inside the end of each finger for attachment of a standard cotton or knit shell inside the glove, and outer tabs at the end of each finger and from the sides of the hand region for attachment of a standard leather shell.

EXAMPLE 2

Example 1 is repeated using an additional mesh type fabric with the joiner film to reinforce and strengthen the tabs. The seal time is increased to about 19 seconds to allow additional time for the molten polyurethane to penetrate and flow through the additional mesh layer and bond with the KEVLAR® layers.

EXAMPLE 3

Example 1 is repeated using 8 ounce/yard NOMEX® fireproof fabric in place of the KEVLAR® materials. All other materials and processing steps are unchanged, and the result is the same as in Example 1

Various changes and modifications to the above illustrative embodiments will become obvious to those skilled in the art in view thereof. All such changes and modifications are intended to be embraced by the scope and spirit of the claims which follow.

I claim:

1. A method for forming a leakproof seal between fabric composites, comprising the steps of:
    (a) finishing first and second fabric sections to have matching fabric edges;
    (b) overlaying a first synthetic membrane parallel with the first fabric section with the first synthetic membrane extending beyond either side of the matching edge of the first fabric section;
    (c) overlaying the first fabric section parallel with a thermoplastic joiner film extending beyond either side of the matching edge thereof;
    (d) overlaying the joiner film parallel with the second fabric section with the matching edge thereof in register with the matching edge of the first fabric section;
    (e) overlaying the second fabric section parallel with a second synthetic membrane extending beyond either side of the matching edges;
    (f) welding adjacent the matching fabric edges to form a seam securing the fabric sections to the joiner film inside the matching edges and securing the synthetic membrane to the joiner film outside the matching edges.

2. The method of claim 1 wherein the finishing step (a) comprises the step of cutting the fabric sections along the matching edge.

3. The method of claim 1 comprising the step of precutting the joiner film along a contour spaced inwardly from said matching edges.

4. The method of claim 3 wherein the precutting step forms positioning tabs extending inwardly from said seam.

5. The method of claim 1 comprising tearing excess joiner film away from an inner edge of said seam.

6. The method of claim 1 wherein the fabric sections comprise non-containable fiber.

7. The method of claim 6 wherein the fiber is aramid.

8. The method of claim 1 comprising the step of removing excess joiner film and synthetic membrane along an outer edge of said seam.

9. The method of claim 8 wherein the removing step comprises cutting.

10. The method of claim 9 wherein the cutting forms positioning tabs extending outwardly from said seam.

11. The method of claim 1 wherein the welding step (e) secures the first and second synthetic membranes to the respective first and second fabric sections along the matching edges thereof.

12. The method of claim 11 wherein each membrane is fused to the respective fabric section in the seam along an outer face of the respective fabric section extending inwardly from the respective matching edge and fused to the matching edge along a transverse dimension thereof.

13. The method of claim 11 comprising the step of inserting tie layers between the first and second fabric sections and the respective first and second synthetic membranes prior to said welding step.

14. The method of claim 1 further comprising the step of placing a mesh fabric between the joiner film and one of the fabric sections prior to said step (f) and wherein said welding step (f) joins the joiner film through the mesh fabric to the adjacent first or second fabric section.

15. A method for forming a leakproof seat between non-containable fabric composites, comprising the steps of:

(a) cutting first and second aramid fabric sections to have matching fabric edges;

(b) overlaying a first synthetic membrane parallel with the first fabric section with an excess of the membrane extending over the matching fabric edge;

(c) overlaying the second synthetic membrane parallel with the second fabric section with an excess of the membrane extending over the matching fabric edge;

(d) precutting a thermoplastic joiner film along a contour similar to the matching fabric edges;

(e) positioning the thermoplastic joiner film layer between the first and second fabric sections with the contour adjacent to and spaced inwardly from the matching edges and extending over the matching edges so as to be disposed between the excess of the membranes;

(f) welding adjacent the matching fabric edges to form a seam comprising a fusion of the first and second fabric sections to the joiner film, of the first and second fabric sections to the respective membranes, and of the excess membranes to the joiner film;

(g) cutting along an outer edge of the seam to remove a portion of the excess membrane and any excess joiner film outward of said seam.

* * * * *